United States Patent [19]

Hattwig et al.

[11] 3,918,553
[45] Nov. 11, 1975

[54] METHOD AND APPARATUS FOR SIGNALING BRAKE LINING WEAR OF A BRAKE

[75] Inventors: Peter Hattwig, Wolfsburg, Germany; Günter Münchenberg, Sao Paulo, Brazil

[73] Assignee: Volkswagenwerk Aktiengesellschaft, Wolfsburg, Germany

[22] Filed: June 7, 1974

[21] Appl. No.: 477,186

[30] Foreign Application Priority Data

June 8, 1973 Germany............................ 2329245

[52] U.S. Cl................................................. 188/1 A
[51] Int. Cl.$^2$......................................... F16D 66/02
[58] Field of Search........ 116/114 Q, 114 A, 114 E; 188/1 A

[56] References Cited
UNITED STATES PATENTS

| | | | |
|---|---|---|---|
| 2,398,006 | 4/1946 | Hunt............................... | 188/1 A X |
| 3,199,631 | 8/1965 | Blankenmeyer..................... | 188/1 A |
| 3,396,824 | 8/1968 | Meier.............................. | 188/1 A X |
| 3,495,689 | 2/1970 | Peach............................. | 188/1 A UX |
| 3,638,764 | 2/1972 | Anders............................ | 188/1 A X |

FOREIGN PATENTS OR APPLICATIONS 1,085,369   9/1967   United Kingdom................. 188/1 A Primary Examiner—Duane A. Reger
Attorney, Agent, or Firm—Ernest F. Marmorek

[57] ABSTRACT

The method of the present invention is particularly characterized by the event of periodically changing the contact pressure between the friction shoe and the braking body at the mutual contact of the raised area and the counter area whereby, during the periodic changing of the contact pressure, a signal is generated to thereby indicate critical wear of the lining. Periodic changing of the contact pressure is indicated, via the control mechanism to the individual operating of the brake. As a further step in the method of the present invention there is provided periodic changing of the braking couple. The signal which is generated during the periodic changing of the braking couple may be in the form of pulsations of the vehicle deceleration. The raised area may be constructed in the form of a cam having a parabolically cured abutting surface. In addition, the counter area may be provided with a covering layer having a wearability which is of a lower order of magnitude of that of the material of the raised area but which is of a higher order of magnitude than that of the friction material of the brake lining.

18 Claims, 11 Drawing Figures

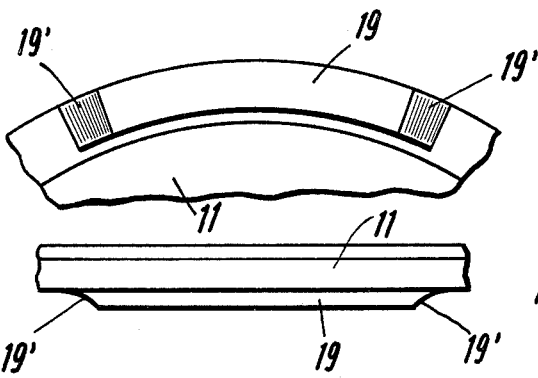
FIG. 4
FIG. 4a
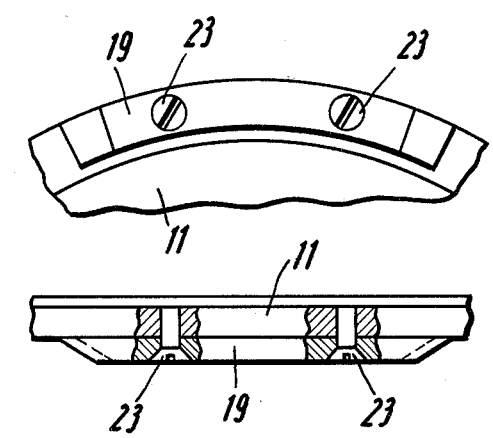
FIG. 5
FIG. 5a
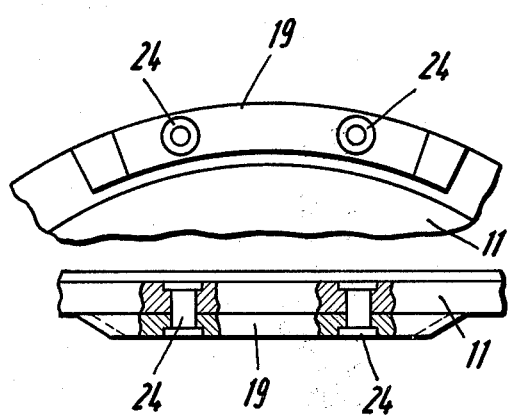
FIG. 6
FIG. 6a

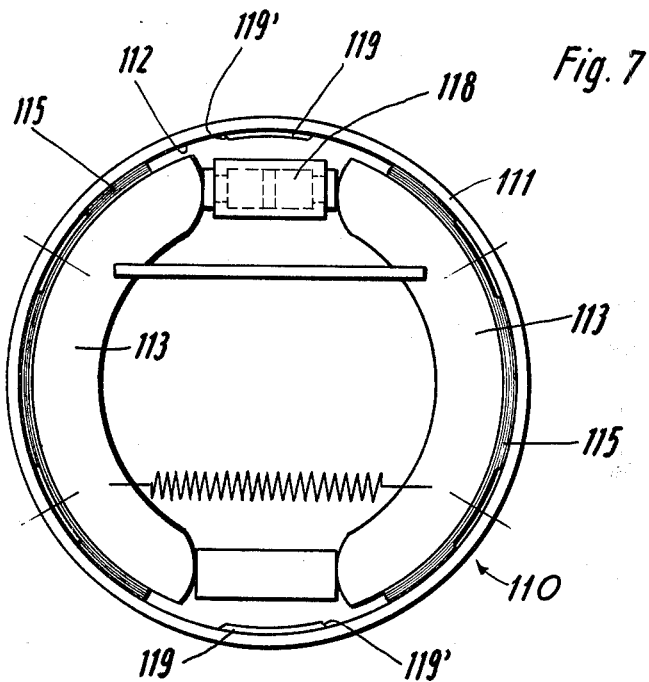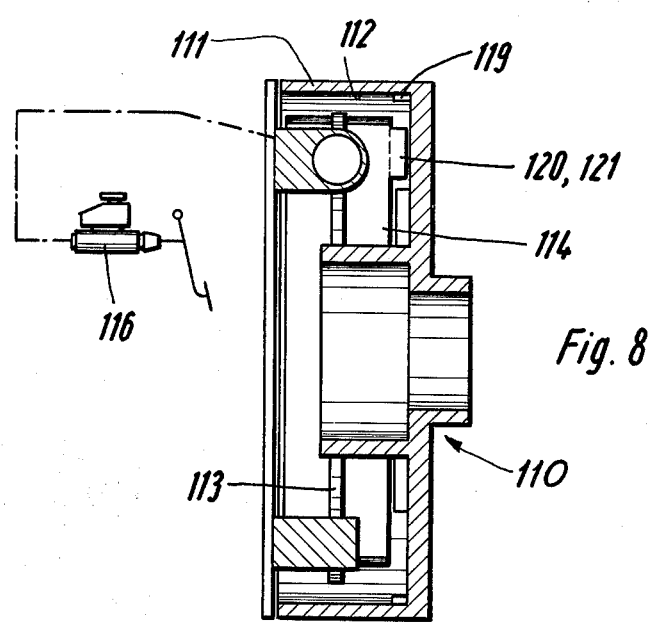

METHOD AND APPARATUS FOR SIGNALING BRAKE LINING WEAR OF A BRAKE

BACKGROUND OF THE INVENTION

1. Field of the Invention

This invention relates generally to the automotive arts and more particularly to an improved method and apparatus for signaling the wear of a lining in a control mechanism equipped brake of a motor vehicle.

2. Description of the Prior Art

Through the disclosure in German Pat. No. 1,136,165, a structure is known by means of which the brake lining wear of a disc brake having a partial lining is indicated by acoustical means. For this purpose, the brake lining supporting bodies of the prior art, which are in the shape of annular segments, are provided with raised edges. After a certain quantity of wear of the lining, the raised edges engage the annular surfaces of the braking body which is constructed in the form of a braking disc. As a result of the engagement of the raised edges and the annular surfaces, shrill noises originate which, in turn, draw the driver's attention to the necessity of changing the brake lining.

However, in the case of the structure disclosed in the aforementioned issued German patent, no assurance can be given that the driver receives a reliable indication with respect to a particular quantity of brake lining wear. It is quite possible that the squealing noise of the brakes, which in passing should be noted is annoying to individuals using the automotive vehicle, could also have other underlying causes. The squeaking noise of the brakes could also occur when the brake lining has suffered no wear as yet or only slight wear. On the other hand, it is not certain that, at the time when the raised marginal sections of the brake lining supporting body come in contact with the brake disc in the prior art structure, noises will be generated of sufficient intensity and sound that the driver will be given adequate warning.

SUMMARY OF THE INVENTION

The present invention comprises a process and apparatus for the signaling of brake lining wear. The present invention is effective in a simple, reliable manner and can be used with several different types of brakes.

One aspect of the present invention provides for a periodic change of the contact pressure between the friction shoe and the braking body during the braking process in the course of the mutual contact of the raised area and the counter area and, during this periodic change of contact pressure, a signal is generated that indicates critical lining wear.

Periodic changes of contact pressure can, by the process and apparatus of this invention, be indicated to the individual operating the brakes in a perceivable manner as pulsations transmitted by the control mechanism. Thus, by the pulsation at the brake pedal which in the context of this application defines a control mechanism, a perceivable signal is given to the driver that the brake lining is worn down considerably.

However, the necessity of renovating the friction shoes due to the advanced brake lining wear can also be made known by a signal in the form of a shaking of the vehicle during the braking process so that in addition to the driver, passengers riding along in the vehicle are alerted as well. This effect is achieved in that a periodic change of the braking couple, which goes hand in hand with the periodic change of the contact pressure created between the friction shoe and the braking body, is indicated in a perceivable manner as pulsations of the deceleration of the vehicle.

Furthermore, the present invention provides apparatus for the execution of the inventive process with the apparatus being simple in its construction and inexpensive to produce. The apparatus of this invention is also suitable for disc brakes as well as for drum brakes.

The structure of the present invention is characterized in that the raised area extending next to the friction area comprises at least one member which is provided at the braking body and which partially extends in the direction of rotation of the braking body. The raised area can advantageously be fabricated in the form of a cam which is provided with a parabolically curved abutting surface.

It is also expedient in one possible form of this invention to cast the raised area that is opposite to the counter area together with the braking body from an homogeneous piece of material. However, in alternative embodiments of the present invention, the raised area can also be attached to the braking body by means of suitable fasteners such as screws, rivets or by welding.

If the braking body is in the form of a brake disc which includes a circular slot or groove, for example a thermal expansion slot which is present in any case, it is possible to provide the raised area within the slot. The raised area can be formed in such a manner that, as far as its extensions in the direction towards the counter area is concerned, it does not extend beyond the plane of the friction area of the brake disc. However, in this case, the counter area has to be removed from the side of the brake lining facing towards the supporting member and in a direction towards the raised member, by at least the approximate dimension of the prescribed residual thickness of the brake lining.

A further advantage of the construction of the present invention resides in that the counter area which is provided at the supporting body includes a covering layer, the wearability of which is of a lower order of magnitude than that of the material of the raised area but of a higher order of magnitude than that of the friction material of the brake lining. Because of this construction, it is assured that, on contact with the counter area the raised area is not abraded and the counter area is not worn away faster than the remaining residue of the brake lining.

With the above and other objects of the invention in view, the invention consists in the novel method, construction, arrangement and combination of various devices, elements and parts as set forth in the claims hereof, certain embodiments of the same being illustrated in the accompanying drawings and described in the specification.

BRIEF DESCRIPTION OF THE DRAWINGS

For a fuller understanding of the nature and objects of the invention, references should be had to the following detailed description taken in connection with the accompanying drawings, in which:

FIG. 4 is a fragmentary, side elevational view of one specific embodiment of the present invention;

FIG. 4a is a fragmentary end elevational view of the structure shown in FIG. 4;

FIG. 5 is a fragmentary side elevational view of another specific embodiment of the present invention;

FIG. 5a is a fragementary, end elevational view, partially in section, of the structure shown in FIG. 5;

FIG. 6 is a fragmentary, side elevational view of still another alternative embodiment of the present invention;

FIG. 6a, is a fragmentary, elevational view, partially in section, of the structure shown in FIG. 6;

FIG. 7 is a side elevational view of a typical drum brake using the structure comprising the present invention; and FIG. 8 is a vertical, section al view of the drum brake shown in FIG. 7.

DESCRIPTION OF THE PREFERRED EMBODIMENT

Figure 1:
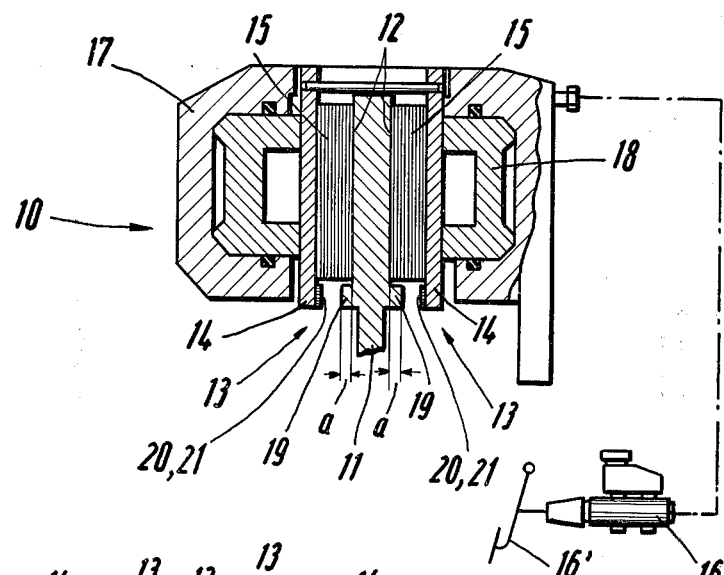
FIG. 1 is a fragmentary, elevational view, partially in cross-section, through a typical disc brake using the present invention.

In FIGS. 1–6, a disc-like braking body 11 which is part of a partially illustrated disc brake 10, is provided with friction areas 12. On both sides of the disc-like braking body 11, one friction shoe 13 is positioned on a supporting body 14 of which, a brake lining 15 made of a suitable friction material is secured. With the aid of a brake pedal 16 and a control mechanism 16 responsive to the actuation thereof, the brake linings 15 can be hydraulically pressed against the friction area 12 of the disc-like braking body 11 through the intervention of a piston 18 which is provided in a brake saddle or housing 17 and which acts upon the supporting body 14.

In the embodiment of the present invention that is illustrated in FIG. 1, each of the sides of the disc-like braking body 11 which face the friction shoes 13, is provided with one raised area 19 each of which, along the friction area 12 is in the shape of a cam-like raised area which extends only partially in the direction of rotation of the disc-like braking body 11.

A counter area 20 which lies opposite the raised area 19 is provided at the lower edge, as shown in the drawing, of the supporting body 14 which is part of the friction shoe 13. The counter area 20 is provided with a covering layer 21, the wearability of which is of a lower order to magnitude than that of the material of the raised area 19. However, the wearability of the covering layer 21 is of a higher order of magnitude than that of the friction material of the brake lining 15.

As soon as the brake lining 15 is worn off, up to a dimension a as shown in FIG. 1, which is determined by the height of the raised area 19, the raised area 19 will come into contact with the counter area 20 at the supporting body 14 thereby producing a periodic change of the contact pressure between the friction shoe 13 and the disc-like braking body 11 when the disc-like braking body 11 is rotating during the braking process. This periodic change of the contact pressure between the friction shoes 13 and the disc-like braking body 11 brings about a rhythmic pulsation of the control mechanism 16 which is part of the brake pedal 16. The rhythmic pulsations depend upon the speed with which the vehicle travels and on the number of revolutions of the disc-like braking body 11. By means of the rhythmic pulsations, an indication or signal is provided to the driver that the brake lining 15 is almost worn off. The more frequently that the brake 10 is operated and the more that the residual brake lining 15 is further worn off, the more intensive will be the pulsations which thereby furnish relaible information relating to the necessity for renovating the friction shoes 13.

However, the fact that it will become necessary to change the friction shoes 13 can also be indicated in a perceivable manner to all of the passengers of the vehicle in the form of a pulsation of the vehicle deceleration during the braking process. In this case the periodic change of the braking couple which goes hand in hand with the periodic change of the contact presure is used as the signaling means whereby the periodic change of the braking couple makes itself felt by a shaking of the vehicle.

Figure 2:
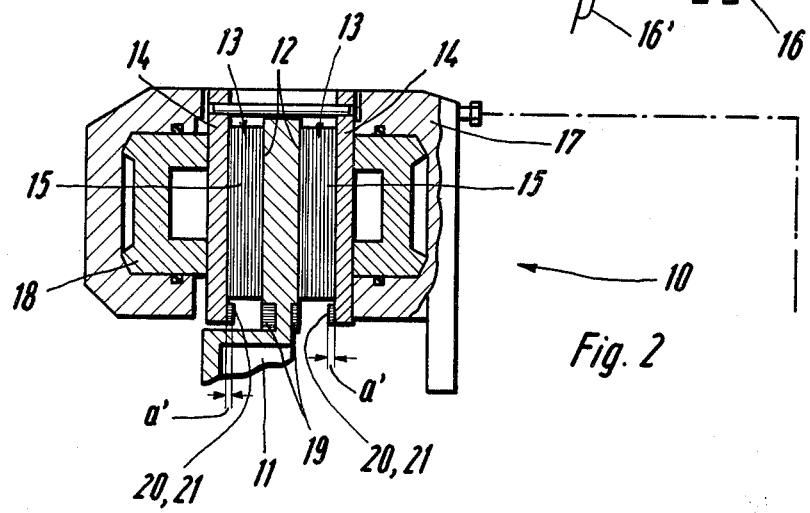
FIG. 2 is a fragmentary, elevational view, partially in cross-section and similar to FIG. 1 but illustrating another type of disc brake using the present invention.
Figure 3:
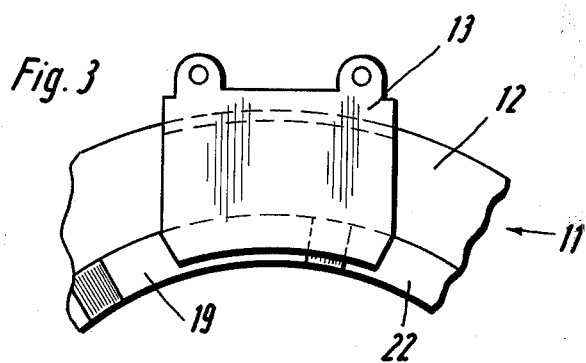
FIG. 3 is a fragmentary, elevational view of the disc brake according to the embodiment shown in FIG. 2.

In the case of the exemplified embodiment shown in FIG. 2 and in FIG. 3, a thermal expansion slot or groove 22 of the disc-like braking body 11 is filled with the raised area 19 which only partially extends within the slot or groove 22. The thermal expansion slot or groove 22 extends in a circular and in a concentric manner along the friction surface 12 such as is shown fragmentarily in FIG. 3. The counter area 20, which is associated with the raised area 19 and which is provided at the lower edge of the supporting body 14 is positioned at a distance approximately equal to the dimension a of the prescribed brake lining thickness from the side of the brake lining 15 facing towards the supporting body 14. The counter area 20 is provided with a covering layer 21, the wearability of which is likewise of a lower order of magnitude than that of the material of the raised area 19 but which is of a higher order of magnitude than that of the brake lining material.

If the brake lining material 15 has been worn down to the height of the counter area 20, the counter area 20 will come in contact with the raised area 19 and, during the braking process, the periodic change of the contact pressure occuring between the friction shoe 13 and the disc-like braking body 11 takes place. By means of this construction the pulsation of the brake pedal 16 and/or of the vehicle deceleration is produced.

Referring once again to FIG. 1, it will be appreciated that the raised area 19 can be cast together with the disc-like braking body 11 from a homogeneous piece of material whereby, as is shown in FIG. 4, the raised area 19 can be constructed in the form of cams having parabolically curved abutting surfaces 19. It should be particularly noted, however, that it is also possible to attach the raised area 19 to the disc-like braking body 11 by means of suitable fasteners such as screws 23 which are shown in FIG. 5, by means of rivets 24 such as are shown in FIG 6 or by still other means such as welding, with the invention on the whole permitting further forms of execution.

Thus, for example, the covering layer 21 which represents the counter area 20 is dispensible. However, it would be expedient in this case, if, at least in the region of the counter area 20, the wearability of the supporting body 14 itself is of a lower order of magnitude than that of the material of the raised area 19 but of a higher order of magnitude than that of the friction material of a brake lining 15. If the embodiment such as is shown in FIG. 2 is used, the supporting body 14 having the aforementioned characteristic possesses an edge which is raised by the dimension a of the prescribed residual thickness of the brake lining 15 with the edge representing the counter area 20.

The invention is not limited to disc brakes 10. It should be clearly noted that it is also possible, such as is shown in FIGS. 7 and 8 to use the process according to the present invention and structural means for the execution of this process in the case of internal expanding brakes 110. As shown in FIGS. 7 and 8, the friction shoes 113 can be pressed against the friction area 112 of a braking body which is constructed in the form of a brake drum 111 through the intervention of a control mechanism 116 and a so-called wheel cylinder. The cam-like raised areas 119 are arranged at the brake drum 111 next to the friction area 112. When the brake lining 115 is worn off to a corresponding degree the cam-like raised areas 119, come in contact with the counter area 120 which is provided on the supporting body 114 of the friction shoe 113 through which the above described signaling is given during the braking process. As shown particularly in FIG. 8, the contact area 120 may be provided with a covering layer 121 of the same type and for the same purpose as described in connection with the previously discussed embodiment.

We wish it to be understood that we do not desire to be limited to the exact details of construction shown and described, for obvious modifications will occur to a person skilled in the art.

Having thus described the invention, what we claim as new and desire to be secured by Letters Patent is as follows:

1. A process for signaling of brake lining wear of a control mechanism equipped brake of a vehicle, particularly of a brake for a motor vehicle, having at least one friction shoe, whereby the brake lining of the friction shoe is mounted on a supporting body and can be brought into frictional contact with a friction area that is part of a rotatable braking body, at least one of the bodies having a raised area which extends part-way in the direction of rotation along the friction area and projects in direction towards the other of the two bodies, the raised area being dimensioned such that it comes in contact with a counter area of the other body only at a prescribed wear of the brake lining, said method comprising periodically changing the contact pressure between the friction shoe and the braking body in response to intermittent contact between the raised area snd the counter area during the braking process, whereby during the said periodic changing of the contact pressure a signal is generated to thereby indicate critical wear of the lining.

2. The process accordiing to claim 1 wherein said periodic changing of the contact pressure is perceivably indicated via the control mechanism to the individual operating the brake.

3. The process according to claim 1 and further comprising the step of periodically changing the braking couple which accompanies said periodic changing of the contact pressure.

4. The process according to claim 1 wherein said periodic changing of the contact pressure is perceivably indicated as a pulsation of the vehicle deceleration.

5. The process according to claim 3, wherein said periodic changing of the braking couple is perceivably indicated as a pulsation of the vehicle deceleration.

6. In apparatus for signaling the wear of a brake lining of a friction shoe in a control-mechanism equipped brake of a vehicle, the brake lining of the friction shoe being mounted on a supporting body whereby the brake lining is adapted to be brought into frictional contact with a friction area of a braking body by means of the control mechanism, one of said bodies being rotatable relative to the other, the improvement comprising at least one rigid cam-shaped raised area located outside said friction area on at least one surface of at least one of the two bodies, said raised area extending part-way in the direction of rotation of said rotatable body and projecting in the direction towards the other body to such an extent that said raised area intermittently comes into contact with a counter area of the other body in response to rotation of said rotatable body but only after a predetermined wear of the brake lining.

7. The improvement according to claim 6 wherein said rotating body is the braking body.

8. The improvement according to claim 7 wherein there is one of said raised areas on each of two opposed surfaces of said braking body.

9. The improvement according to claim 6 wherein said raised area has parabolically curved end surfaces.

10. The improvement according to claim 6 wherein said raised area is formed integrally with the braking body.

11. The improvement according to claim 6, further comprising fastener means for securing said raised area to the braking body.

12. The improvement according to claim 11, wherein said fastener means are screws.

13. The improvement according to claim 11, wherein said fastener means are rivets.

14. The improvement according to claim 6 wherein the portion of said supporting body opposite said raised area has a wear resistance which is of a lower order of magnitude than that of the material of said raised area but of a higher order of magnitude than that of the friction material of the brake lining.

15. The improvement according to claim 6 further comprising a covering layer formed on said supporting body opposite said raised area, said covering layer having a wear resistance which is of a lower order of magnitude than that of the material of said raised area but of a higher order of magnitude than that of the friction material of the brake lining.

16. The improvement according to claim 6 wherein the brake is a disc brake.

17. The improvement according to claim 6 wherein the brake is a drum brake.

18. The improvement according to claim 6 wherein the brake also includes a thermal expansion slot and said raised area is positioned in said slot.

* * * * *